(12) United States Patent
De La Garza Grillo (10) Patent No.: US 12,145,687 B2
(45) Date of Patent: Nov. 19, 2024

(54) ELECTRIC LIGHT WEIGHT STANDING TRICYCLE

(71) Applicant: Mauricio De La Garza Grillo, Altamonte Springs, FL (US)

(72) Inventor: Mauricio De La Garza Grillo, Altamonte Springs, FL (US)

( * ) Notice: Subject to any disclaimer, the term of this patent is extended or adjusted under 35 U.S.C. 154(b) by 0 days.

(21) Appl. No.: 17/964,069

(22) Filed: Oct. 12, 2022

(65) Prior Publication Data
US 2024/0124089 A1 Apr. 18, 2024

(51) Int. Cl.
| | |
|---|---|
| *B62K 5/027* | (2013.01) |
| *B60K 7/00* | (2006.01) |
| *B60L 50/60* | (2019.01) |
| *B62D 51/02* | (2006.01) |
| *B62D 61/08* | (2006.01) |
| *B62K 5/10* | (2013.01) |
| *B62K 21/12* | (2006.01) |
| *B62M 7/12* | (2006.01) |
| *B62K 5/00* | (2013.01) |

(52) U.S. Cl.
CPC ............ *B62K 5/027* (2013.01); *B60K 7/0007* (2013.01); *B60L 50/60* (2019.02); *B62D 51/02* (2013.01); *B62D 61/08* (2013.01); *B62K 5/10* (2013.01); *B62K 21/12* (2013.01); *B62M 7/12* (2013.01); *B60L 2220/44* (2013.01); *B60Y 2200/122* (2013.01); *B62K 2005/001* (2013.01); *B62K 2201/04* (2013.01); *B62K 2204/00* (2013.01)

(58) Field of Classification Search
CPC . B62K 5/027; B62K 5/00; B62K 5/02; B62K 5/10; B62K 21/12; B62K 2005/001; B62K 2201/04; B62K 2204/00; B62K 2202/00; B62M 7/12; B62D 51/02; B62D 51/00; B62D 61/06; B62D 61/08; B60K 7/0007; B60K 7/00; B60L 2220/44; B60L 50/60; B60Y 2200/122; B60Y 2200/12
USPC .............. 180/214, 65.51, 210, 211, 212, 213
See application file for complete search history.

(56) References Cited

U.S. PATENT DOCUMENTS

| | | | | |
|---|---|---|---|---|
| 6,267,190 | B1 * | 7/2001 | Micheletti ............. | B62K 3/002 180/196 |
| 2003/0127266 | A1 * | 7/2003 | Kirkpatrick ............ | B62K 3/002 180/206.1 |
| 2009/0255747 | A1 * | 10/2009 | Kasaba .................. | B62D 51/02 180/208 |
| 2011/0266079 | A1 * | 11/2011 | Boyd ..................... | B62K 3/002 180/65.51 |
| 2014/0090910 | A1 * | 4/2014 | Treadway ............ | B62K 15/008 280/651 |

(Continued)

FOREIGN PATENT DOCUMENTS

| | | | |
|---|---|---|---|
| CN | 108639215 A | * 10/2018 | |
| WO | WO-2004020269 A1 | * 3/2004 | ............ B62D 51/02 |

(Continued)

*Primary Examiner* — Keith J Frisby (57) ABSTRACT

The HOVERTRIKE is an Electric Standing Trike, it is a light sport and recreational vehicle with the capabilities of riding on the road and off the road. It is equipped with three wheels and three motors, one inside each wheel. At the front, it looks like a standard e-bike with a hub motor inside the wheel and a standard bicycle fork with suspension, brakes, and handlebar. The back frame is equipped with a hub motor, independent suspension, and disc brakes for tilting and cornering.

4 Claims, 7 Drawing Sheets

(56) References Cited

U.S. PATENT DOCUMENTS

2019/0315425 A1* 10/2019 Bartolotta ................ B62J 43/20
2020/0324844 A1* 10/2020 MacDonald ............... B62J 9/30

FOREIGN PATENT DOCUMENTS

| WO | WO-2009070035 A2 * | 6/2009 | ............. B62K 3/002 |
| WO | WO-2020204869 A1 * | 10/2020 | |

* cited by examiner

ELECTRIC LIGHT WEIGHT STANDING TRICYCLE

FIELD OF INVENTION

The present invention relates to electro-tricycles, more particularly it relates to an electric-tricycle that utilizes lithium-ion batteries and electric hub motors as a propulsion system with a suspension and tilting capabilities.

BACKGROUND OF INVENTION

Electric transportation plays an important role in a sustainable future, especially light electric vehicles. A tricycle, sometimes abbreviated to trike, is a human-powered (or gasoline or electric motor powered or assisted, or gravity powered) three-wheeled vehicle. Some tricycles, such as cycle rickshaws (for passenger transport) and freight trikes, are used for commercial purposes, especially in the developing world, particularly Africa and Asia. In the West, adult-sized tricycles are used primarily for recreation, shopping, and exercise. Tricycles are favored by children and senior adults for their apparent stability versus a bicycle; however, a conventional trike has poor dynamic lateral stability, and the rider must take care when cornering to avoid tipping the trike over. Unconventional designs such as recumbents have a lower center of gravity so require less care. Classed as motorcycles as a result of their light construction and potential better streamlining, they are usually less expensive to operate. A motorized tricycle, motor trike, or motorcycle is a three-wheeled vehicle based on the same technology as a bicycle or motorcycle, and powered by an electric motor, motorcycle, scooter or car engine. The motorized tricycle had quite a boom period at the end of the 19th century. Early engines weren't as compact or lightweight as modern ones, and clutches, and electric ignition were still new ideas being incorporated. Given this, the tricycle offered a better platform to add an engine to than a bicycle.

Electric powered scooters are known. More particularly, an electric kick scooter exemplary of that set forth and claimed in U.S. Pat. No. 11,059,538. Prior art scooters typically have two wheels, while this construction is simple and inexpensive, it is also fairly unstable, and can be difficult to ride. Most scooters or scooter type vehicles are inherently unsafe due to their smaller wheels, they can get stuck easily and drop the rider. They also require balance and skill for good use. Also, most other devices don't provide any type of suspension or tilting capabilities.

SUMMARY OF INVENTION

The following summary discloses all the features and functions of the present invention, by considering the whole specifications, claims, drawings and abstract, one can easily get a full understanding of the invention and how it functions.

The main object of the present invention is to provide an electric light weight standing tricycle, which facilitates users to a simple, affordable and energy efficient tricycle with stability, robust suspension and tilting capabilities for superior curving, easy startup, and a safe option for traveling over wet streets, on gravel, or poorly maintained roads, and at all speeds.

The present invention is an electric light weight standing tricycle, it is a light sport and recreational vehicle with the capabilities of riding on the road and off the road. It is equipped with three wheels and three motors, one inside each wheel. The front embodiment looks like a standard e-bike with a hub motor inside the wheel and a standard bicycle fork with suspension, brakes, and handlebar. The back platform comprises of a different set up opposed to standard bikes. Instead of a sit and pedals, the present invention features a central pole that goes directly to the two independent back wheels also equipped with a hub motor, independent suspension, and disc brakes.

To attain the above-mentioned object, the (Hover trike) electric light weight standing tricycle provided by the present invention comprises of: a front tire, a front fork with suspension, Handlebars, Brake Lever, Speed and Battery Reader, Hub Motor, Perforated Disc Brakes, Central Main Stem, Motor Controller, Lithium Ion Battery, Back Wheels, and a tilting Main Platform. The electric lightweight standing tricycle (Hover trike) uses a main frame made from Metallic (Aluminum-Steel) Frames that consist of squared metallic tubes that connect the back platform to the handlebars and the front wheel, and a back platform, that consists of a complex rectangular frame that allows for two-dimensional movement. The Back Platform consists of a double rectangle metallic frame composed of a top side, a bottom side, two lateral sides and a front side. The back consists of a 6" by 12" by 22" platform that's built on an aluminum frame that provides both leaning (tilting) capabilities and independent suspension provided by a central shock absorber. 8 square tubes are joined to 8 round tubes that make 4 shapes similar to a letter H. These 4 H's are joined on the sides by metal strips, ball bearings, and a threaded rod, this provided the freedom of movement necessary.

The electric light weight standing tricycle (Hover trike) of the present invention can use 1, 2 or 3 hub motors which can be installed and located in the front wheel, in the back wheels or on all three wheels depending on the desired end result. This present embodiment uses a 1200 w and 48 v front wheel hub motor, with a 20 inch fat tire wheel.

A lithium-ion battery of 12.6 Ah and 48 v gives it a 30 mile approximate battery range. The battery is installed on the frame body and electrically connected to the motor controller. The motor controller is necessary to transfer power from the battery to the motor, each electric motor needs a device capable of making thousands of continuous changes to the current. The Motor Controller with an exposed controller is installed on the main stem that connects the platform where the rider stands to the handlebars and the front wheel. The Hydraulic perforated disc brake technology of the (Hover trike) of the present invention is basic on all MTB units and necessary for most e-bikes. The present invention utilizes one perforated hydraulic disc brake on the front wheel only but is not limited to this, future versions may have disc brakes installed on all wheels. The electric light weight standing tricycle (Hover trike) of the present invention further employs the use of two shock absorbers integrated in the fork of the front wheel and a third shock absorber in the center of the back platform, which provides suspension to the rider while allowing each back wheel to have independent suspension and enough movement liberty to lean and tilt. The present invention is a light electric three wheeled standing electric tricycle that uses lithium-ion batteries and electric hub motors as a propulsion system. As a low weight electric vehicle, the present invention has a very high energy efficiency. Its simple design allows for easy and low-cost manufacturing and can make use of recycled materials to manufacture.

The present invention requires absolutely no training and very low skill for using. It offers more stability than an average two-wheel bike or scooter. You can't get out of balance on the present invention, even if you cycle slowly, and it doesn't fall over when it is stationary. A rider can easily get on and off the bike. It can be used on many kinds of terrain safely and with perfect stability thanks to its three wheels, it's also budget friendly with a simple design with low number of materials needed.

HOW THE INVENTION IS MADE AND USED

As it is traditional for most vehicles or motorcycle, the (Hover trike) is made of a metallic frame that is put together using traditional methods such as welding and bolts. The present invention is made of two important frames; the main frame that consists of squared metallic tubes which connect the back platform to the handlebars and the front wheel, and the back platform, that consists of a complex rectangular frame that allows for two-dimensional movement. The Main Frame consist of two 3×1 metallic tubes welded together with another round tube that works as the headset. The main stem is welded to the headset at an angle. The Back Platform consists of a double rectangle metallic frame composed of a top side, a bottom side, two lateral sides and a front side. 8 square tubes are joined to 8 round tubes that make 4 shapes similar to a letter H. These 4 H's are joined on the sides by metal strips, ball bearings, and a threaded rod, and provides the freedom of movement necessary.

The (Hover trike) is further comprised of a few core technologies such as hub motors, providing from 250 w to 3000 w of power. The hub motors use a complex arrangement of powerful magnets and copper wire to provide direct power to the wheels. This assembly does not require any type of chain or power belt to work. The (Hover trike) uses 1, 2 or 3 hub motors that are located on the front wheel, on the back wheels or on all three wheels depending on the desired end result. The present invention make use of a 1200 w and 48 v front wheel hub motor, with a 20 inch fat tire wheel.

Lithium-Ion Batteries are further installed and affixed. This is a typical technology used for all types of electric vehicles. Battery density and capacity can change based upon the needs of the end user. This present invention uses a 12.6 Ah and 48 v battery, which gives it a 30 mile approximate battery range. Motor Controllers are installed and necessary to transfer power from the battery to the motor, each electric motor needs a device capable of making thousands of continuous changes to the current. The present invention has an exposed controller installed on the main stem that connects the platform where the rider stands to the handlebars and the front wheel. As required in all modes of transportation, the need for a braking system. The Hover trike of the present invention employs the use of Hydraulic perforated disc brakes. This technology is basic on all MTB units and necessary for most e-bikes. The present invention utilizes one perforated hydraulic disc brake on the front wheel only. Future versions can have disc brakes on all wheels. Shock Absorbers are also present and installed. Using air or oil shock absorbers provides the capacity to cushion impacts that come on either side of the cylinder of the present invention. The present invention uses two shock absorbers integrated in the fork of the front wheel and a third shock absorber in the center of the back platform. It provides suspension to the rider while allowing each back wheel to have independent suspension and enough movement liberty to lean and tilt. Ball Bearings (Tilting Technology) provides tilting capabilities, thanks to traditional ball bearings that provide motion to the joints of the back platform frame. The various parts of the Hove trike were welded together and constructed using TIG welding on aluminum.

The first step to making the Hover trike is to gather all necessary components or parts which can be easily obtained at bicycle shops or similar or purchased. This consists of; a Front wheel rim with hub motor, a front tire and innertube, Front disk brake, Front hydraulic brakes, Front fork with variable suspension, Handlebar base, Handlebars, Brake Levers and Throttle, Motor Controller, Lithium-Ion Battery, Coil Spring Rear Shock Absorber, precision Ball Bearings, Back Wheels of around 14 inches, Wide array of screws, bolts and nuts.

I. Once all buyable parts are ready a person skilled in the art can fabricate the main frame and the back platform frame.

II. The Main Frame consists of two 3×1 metallic tubes welded together with a round tube that works as the headset. The main stem is welded to the headset at an angle.

I. The Back Platform consists of a double rectangle metallic frame forming a top side, a bottom side, two lateral sides and a front side. 8 square tubes are joined to 8 round tubes that make 4 shapes similar to a letter H. These 4 H's are joined on the sides by metal strips, ball bearings, and a threaded rod. This assembly provides the freedom of movement necessary for the Hover trike. To complete the Back Platform a person skilled in the art welds two limbs at 45 degrees approximately on the bottom side which will hold the coil spring rear shock absorber right at the center of the platform. The top side is then covered with two metallic plates that will enable rider to stand and support their weight while using the Hover trike. The two lateral sides are further welded together to hold the wheel hub on either side. And lastly, the front plate is attached. This must contain a hole with reinforcement inside that will serve as the connecting point to the main frame and stem. Insert the two 14 inches wheels and wheel rod at the two lateral sides of the back platform.

II. Insert the fork's main tube to the headset and then attach the wheel with the hub motor to the fork.

III. Insert a ball bearing and then the handlebar base, along with the handlebars, the brake levers and the throttle.

IV. Screw the main Lithium-Ion Battery to the main stem.

V. Screw the motor controller to the main stem.

VI. Connect all necessary cables and join the main frame to the back platform with screws on the inside of the platform. Add additional accessories like lights or any others.

Using the (Hover trike) of the present invention is very intuitive and requires little or no instruction. In its assembled form, the (Hover trike) is already assembled and ready to use with the instructions as following:

1. Perform a safety check: Make sure the front wheel is properly and tightly attached to the fork, make sure that brakes are working, and the battery is charged, also make sure all nuts are tight and that the vehicle feels sturdy and secure.
2. The (Hover trike) of the present invention consists of two main parts, the front and rear. The front is very similar to all e-bicycles and operates in the same way, a rider can steer the tricycle by turning the handlebars left or right, you can apply brake with the brake lever and accelerate with the throttle.

The rear consists of a leaning platform where you must stand in order to operate the vehicle.

3. To ride or use the Hover trike of the present invention, a rider must step onto the platform and hold the handlebars with both hands, making sure the front wheel and handlebars are straight before accelerating.
4. When rider is in a relaxed position with both feet aligned to shoulders, to move forward the rider squeezes or twists the throttle and it will move forward. In order to halt, one must squeeze the brake lever until stopping is achieved. To turn or maneuver the hover trike, a rider will tilt the back wheel naturally, this shall be accompanied by the body of the rider as well as with the feet and the position of the handlebars. The objective is to harmonize the movement of the legs and the handlebar so that the vehicle can provide it's skiing sensation, which also helps when making tight turns.
5. In order to dismount the tricycle, all is needed is to bring the vehicle to a complete stop and then step down naturally.

DETAILED DESCRIPTION OF THE PREFERRED EMBODIMENTS

Figure 1:
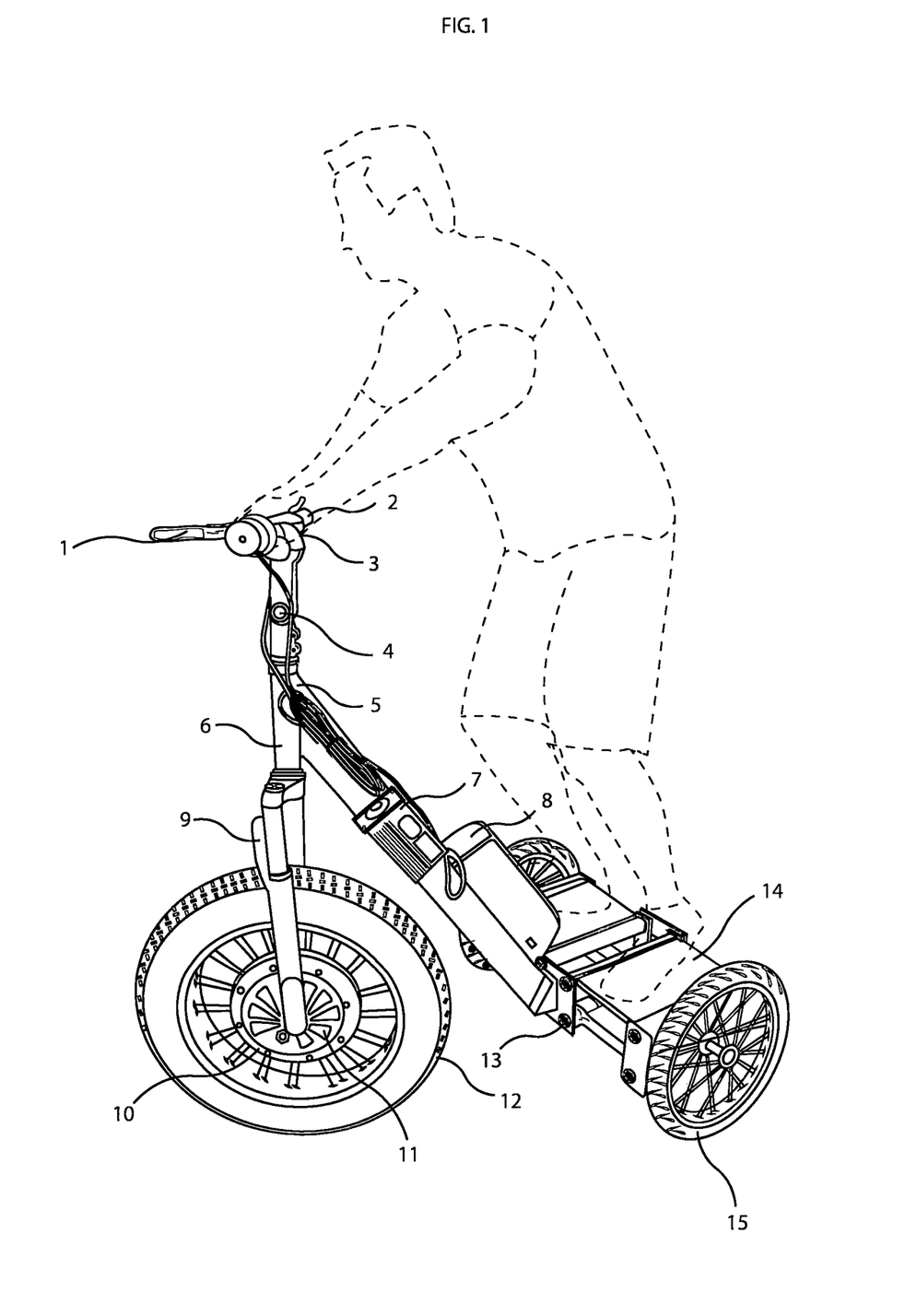
FIG. 1. is a perspective view of a rider on the electric standing tricycle of this invention illustrating the rider standing on the supporting platform.

In FIG. 1 the perspective view of the invention is disclosed, illustrating a rider on it, which reveals the hand brakes (1), attached to the handlebars (2) the throttle (3), adjustable bike stem (4), connected to the main neck stem (5). And all securely connected to the head tube (6), it further comprises of double cylinder fork (9) which is firmly attached to a 20 inch fat tire front wheel (12) the front wheel further comprises of the 48 v 1200 w hub motor (10) and the brake pad (11). The main neck stem (5) is jointly attached to the rear standing platform (14) with bolts and screws (13). Said main neck stem (5) further discloses the motor controller (7) and the lithium-ion battery pack (8). The standing platform (14) is jointly affixed to the 14 inch tire spoke rear wheel (15).

Figure 2:
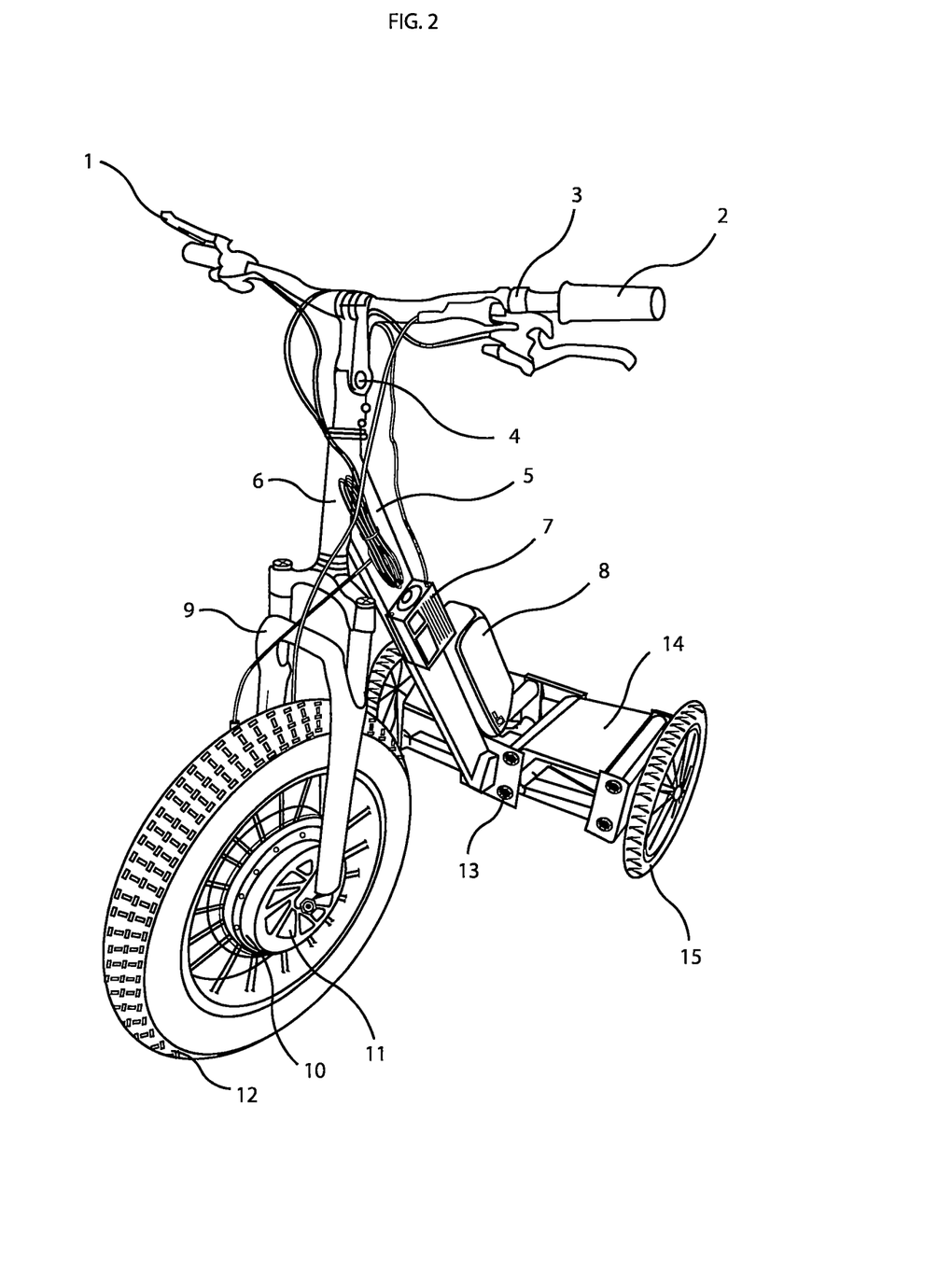
FIG. 2 is a front perspective view of the electric standing tricycle of this invention as shown in FIG. 1 illustrating the various embodiments.

In FIG. 2 the front side view of the invention is disclosed, which further reveals the hand brakes (1), attached to the handlebars (2) the throttle (3), adjustable bike stem (4), the main neck stem (5), the head tube (6), motor controller (7) and the lithium-ion battery pack (8), double cylinder fork (9), front wheel (12), the hub motors (10), the brake pad (11), bolts (13), standing platform (14) and 14 inch tire spoke rear wheel (15).

Figure 3:
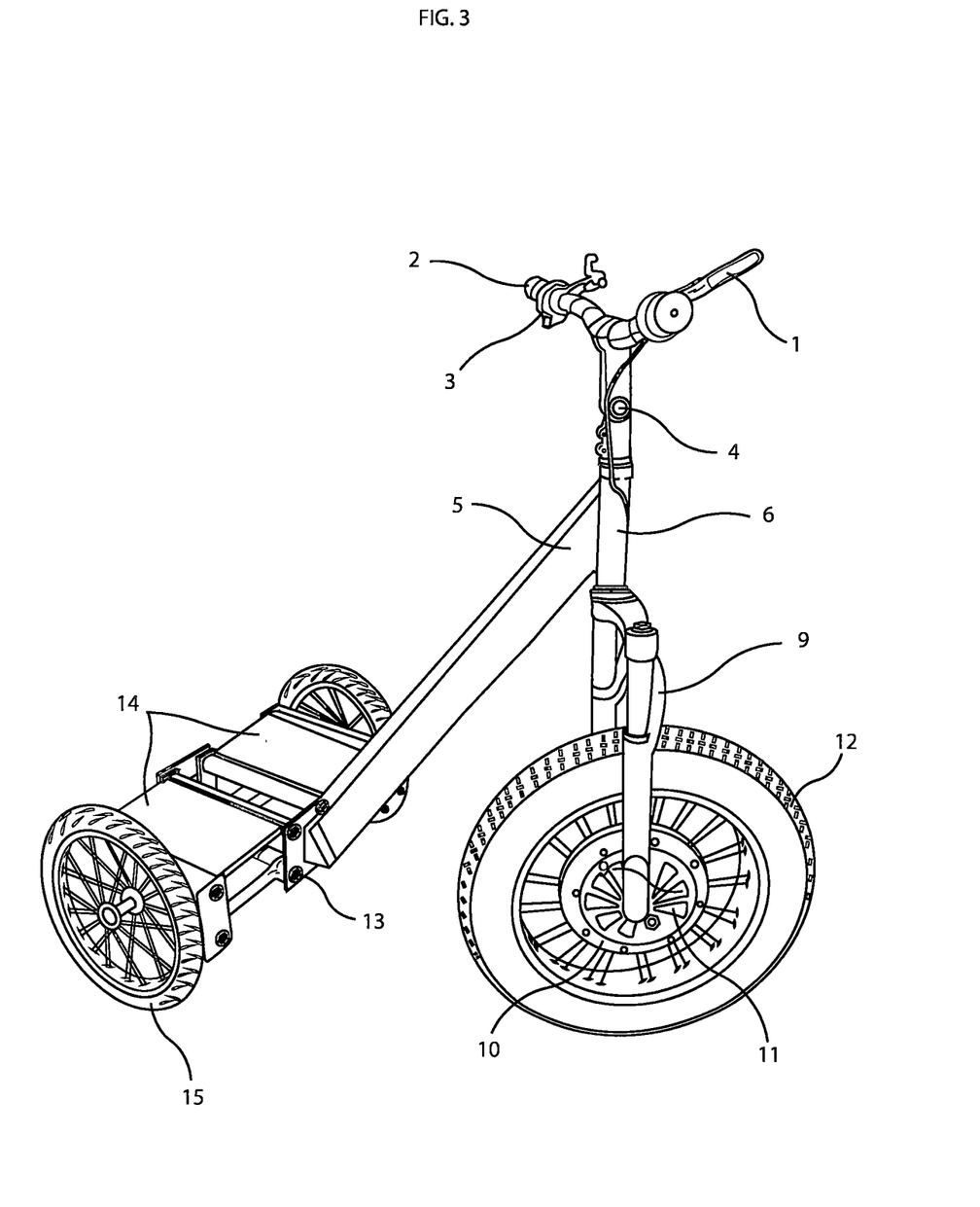
FIG. 3 is a right-side view of the electric standing tricycle of this invention.

In FIG. 3 the present invention discloses the right-side view of the invention which further reveals the hand brakes (1), attached to the handlebars (2) the throttle (3), adjustable bike stem (4), the main neck stem (5), the head tube (6), double cylinder fork (9), front wheel (12), the hub motor (10), the brake pad (11), bolts (13), standing platform (14) and 14 inch tire spoke rear wheel (15).

Figure 4:
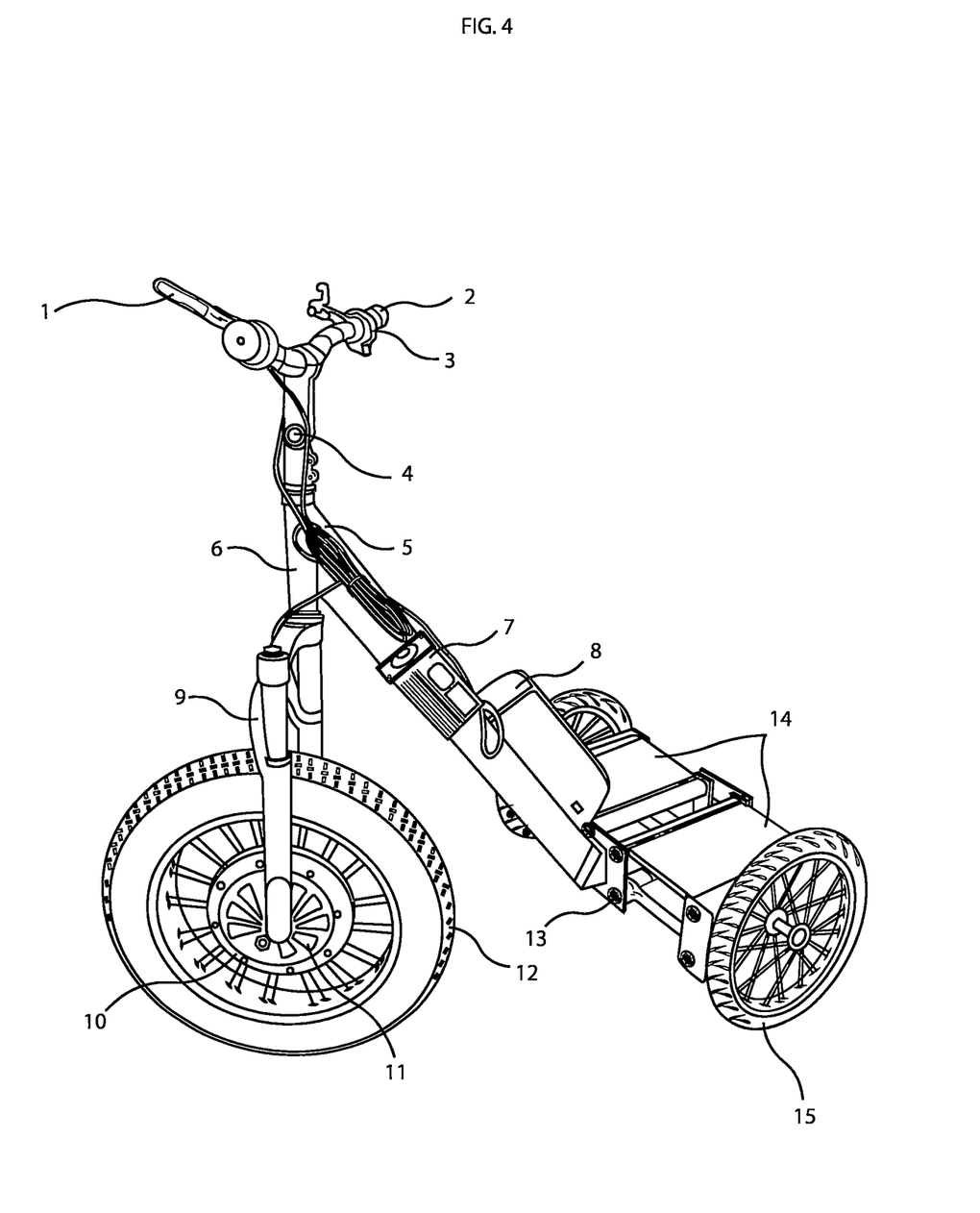
FIG. 4 is a left-side view of the electric standing tricycle of this invention.

In FIG. 4 the present invention discloses the left-side view of the invention which further reveals the hand brakes (1), attached to the handlebars (2) the throttle (3), adjustable bike stem (4), the main neck stem (5), the head tube (6), motor controller (7), lithium-ion battery pack (8), double cylinder fork (9), front wheel (12), the hub motor (10), the brake pad (11), bolts (13), standing platform (14) and 14 inch tire spoke rear wheel (15).

Figure 5:
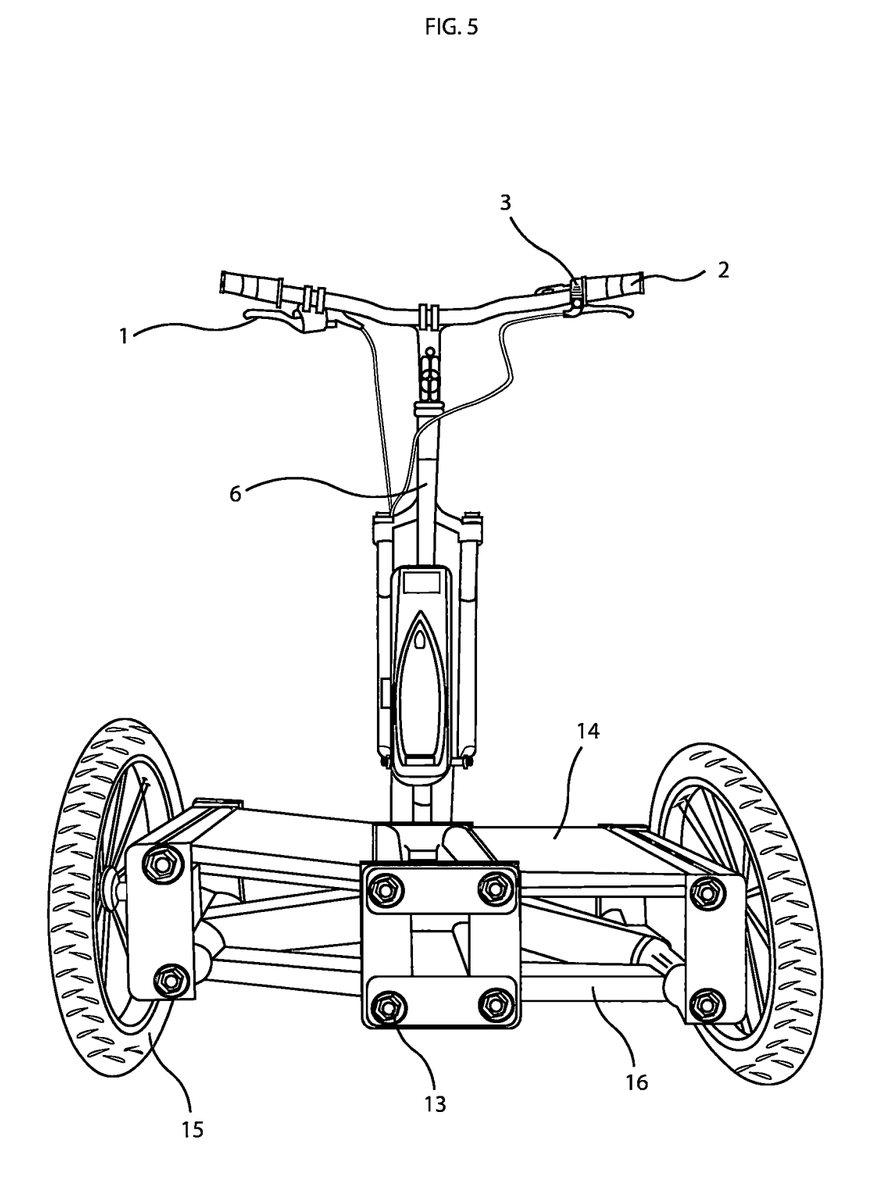
FIG. 5 is a rear-side view of the electric standing tricycle of this invention.

In FIG. 5 the present invention discloses the rearview of the invention which further reveals the hand brakes (1), handlebars (2), the throttle (3), the headtube (6), bolts (13), articulated joint (16), standing platform (14) and the 14 inch tire spoke rear wheel (15).

Figure 6:
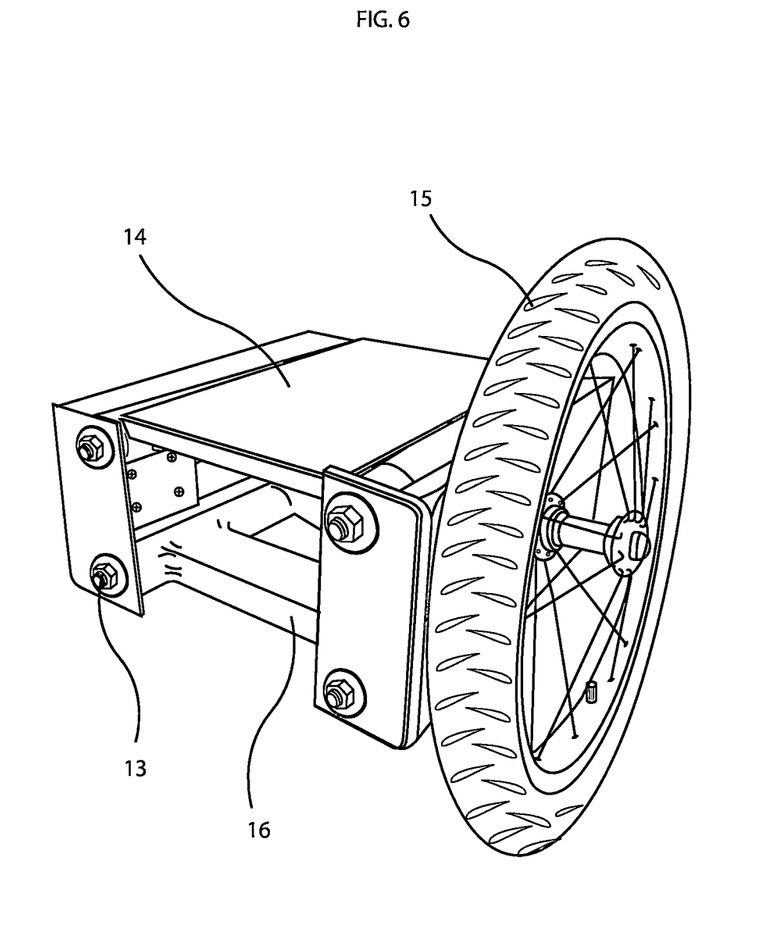
FIG. 6 is a side elevation section of the rear platform of the electric standing tricycle of this invention.

In FIG. 6 the close-up sectional view of the back platform is disclosed, which comprises the standing platform (14), articulated joints (16) jointly affixed to the 14 inch tire spoke rear wheel (15) and the screws (13).

Figure 7:
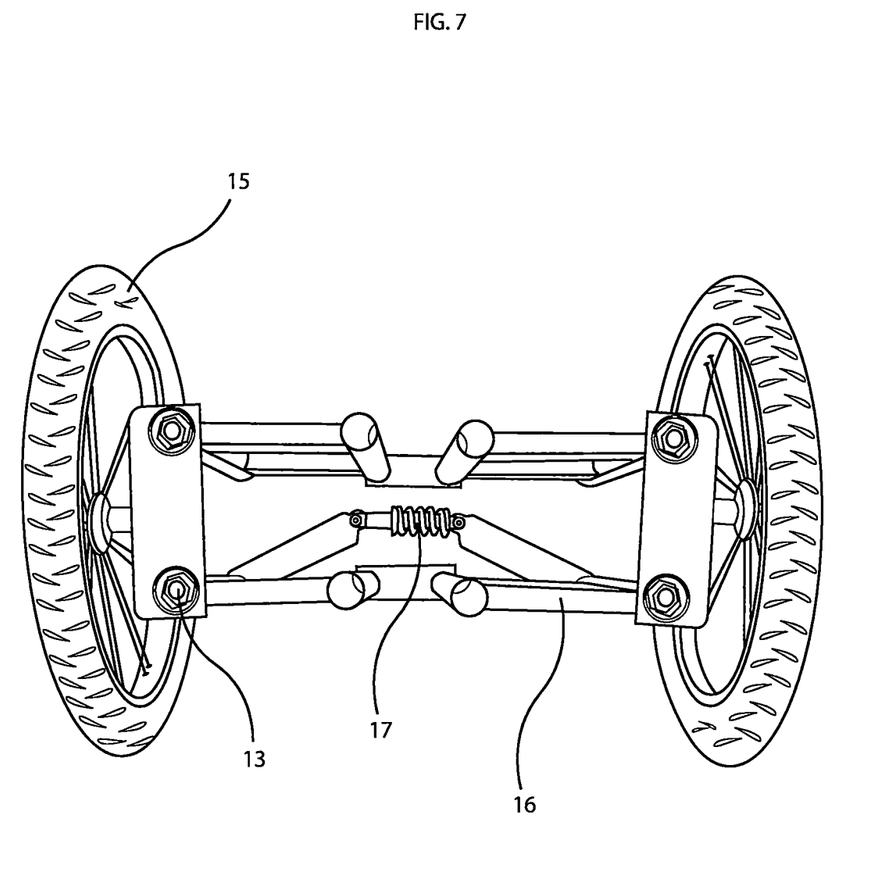
FIG. 7 is a bottom view to the underside of the standing platform of the electric standing tricycle of the present invention as shown in FIG. 6 showing the support platform and suspension shock absorber mounted below the platform of the electric standing tricycle.

In FIG. 7 the bottom section view of the standing platform is disclosed, this further reveals the 14 inch tire spoke rear wheel (15), articulated joints (16), and the coil spring rear suspension absorber (17).

The invention claimed is:

1. An electric standing tricycle comprising: a rear member, a front member having a plurality of hand brakes attached to handlebars, a throttle, an adjustable bike stem permanently secured and connected to a main neck stem and jointly secured permanently to a head tube, said head tube is further attached to a double cylinder fork which is firmly attached to a 20 inch tire front wheel, said main neck stem is further attached to a rear standing platform, wherein said main neck stem is further affixed to a motor controller and lithium-ion battery pack, and the rear standing platform is jointly attached to a 14 inch tire spoke rear wheel and the lithium-ion battery pack, wherein said rear standing platform is jointly secured with an articulated joint, and further attached to a coil spring rear suspension absorber.

2. An electric standing tricycle comprising: a front member having a plurality of hand brakes attached to handlebars, a throttle, an adjustable bike stem permanently secured and connected to a main neck stem and jointly secured permanently to a head tube, said head tube is further attached to a double cylinder fork which is firmly attached to a 20 inch tire front wheel, said main neck stem is further attached to a rear standing platform, wherein said main neck stem is further affixed to a motor controller and lithium-ion battery pack, and the rear standing platform is jointly attached to a 14 inch tire spoke rear wheel and the lithium-ion battery pack, wherein said rear standing platform consists of a double rectangle metallic frame composed of a top side, a bottom side, two lateral sides and a front side.

3. An electric standing tricycle comprising: a front member having a plurality of hand brakes attached to handlebars, a throttle, an adjustable bike stem permanently secured and connected to a main neck stem and jointly secured permanently to a head tube, said head tube is further attached to a double cylinder fork which is firmly attached to a 20 inch tire front wheel, said main neck stem is further attached to a rear standing platform, wherein said main neck stem is further affixed to a motor controller and lithium-ion battery pack, and the rear standing platform is jointly attached to a 14 inch tire spoke rear wheel and the lithium-ion battery pack, wherein two shock absorbers are integrated in the fork of the front wheel and a third shock absorber is integrated in the center of the rear standing platform, which provides suspension to a rider and enough movement liberty to lean and tilt.

4. An electric standing tricycle comprising: a front member having a plurality of hand brakes attached to handlebars, a throttle, an adjustable bike stem permanently secured and connected to a main neck stem and jointly secured permanently to a head tube, said head tube is further attached to a double cylinder fork which is firmly attached to a 20 inch tire front wheel, said main neck stem is further attached to a rear standing platform, wherein said main neck stem is further affixed to a motor controller and lithium-ion battery pack, and the rear standing platform is jointly attached to a 14 inch tire spoke rear wheel and the lithium-ion battery pack, wherein said rear standing platform comprises 8 square tubes which are permanently joined to 8 round tubes, and said 8 round tubes are used to make four shapes similar to a ladder, joined on the sides by metal strips, ball bearings, and a threaded rods.

* * * * *